US006114483A

United States Patent [19]
Coughlin et al.

[11] Patent Number: 6,114,483
[45] Date of Patent: Sep. 5, 2000

[54] POLYMERIZATION OF OLEFINS

[75] Inventors: Edward Bryan Coughlin; Samuel David Arthur; Steven Dale Ittel, all of Wilmington, Del.

[73] Assignee: E. I. du Pont de Nemours and Company, Wilmington, Del.

[21] Appl. No.: 09/140,080

[22] Filed: Aug. 25, 1998

Related U.S. Application Data

[60] Provisional application No. 60/057,077, Aug. 27, 1997.

[51] Int. Cl.[7] .............................. C08F 4/26; C08L 23/06
[52] U.S. Cl. ................. 526/172; 526/160; 526/348.6; 526/352; 526/943; 526/113; 526/118; 525/240; 556/32; 556/138
[58] Field of Search ...................... 526/172, 159, 526/161, 171, 348.6, 160, 943, 352; 525/191, 195, 245, 326.1, 240; 556/32, 138

[56] References Cited

U.S. PATENT DOCUMENTS

| | | | |
|---|---|---|---|
| 4,530,914 | 7/1985 | Ewen et al. | 502/113 |
| 4,937,299 | 6/1990 | Ewen et al. | 526/119 |
| 5,071,927 | 12/1991 | Benham et al. | 526/64 |
| 5,137,994 | 8/1992 | Goode et al. | 526/75 |
| 5,395,810 | 3/1995 | Shamshoum et al. | 502/113 |
| 5,595,705 | 1/1997 | Walton et al. | 264/456 |
| 5,622,906 | 4/1997 | Pettijohn et al. | 502/104 |
| 5,643,846 | 7/1997 | Reddy et al. | 502/104 |
| 5,686,542 | 11/1997 | Ostoja-Starzewski et al. | 526/75 |
| 5,714,427 | 2/1998 | Winter et al. | 502/117 |
| 5,714,556 | 2/1998 | Johnson et al. | 526/135 |
| 5,753,785 | 5/1998 | Reddy et al. | 526/75 |
| 5,856,610 | 1/1999 | Tamura et al. | 585/517 |

FOREIGN PATENT DOCUMENTS

| | | | |
|---|---|---|---|
| 0 361 363 A2 | 9/1989 | European Pat. Off. | C08F 210/02 |
| 0 893 455 | 4/1997 | European Pat. Off. | C08F 4/70 |
| 197 07 236 | 2/1997 | Germany | C08F 4/625 |
| WO 90/15085 | 12/1990 | WIPO | C08F 110/02 |
| WO 96/23010 | 8/1996 | WIPO . | |
| WO97/02298 | 1/1997 | WIPO | C08F 10/02 |
| WO97/38024 | 10/1997 | WIPO | C08F 4/70 |
| WO 97/48735 | 12/1997 | WIPO . | |
| WO98/38228 | 9/1998 | WIPO | C09F 10/02 |

OTHER PUBLICATIONS

PCT International Search Report for PCT/US98/17656 dated Dec. 17, 1998.

Kazuo Soga, et al., Polymerization of olefins with noble metal (Ru, Rh, Rd) compounds activated by alkylaluminium or alkyltitanium compounds, *Die Makromolekulare Chemie, Rapid Communications,* vol. 11, No. 6, pp. 285–291, 1990.

Christoph Denger, et al., Simultaneous oligomerization and polymerization of ethylene, *Die Makromolekulare Chemie, Rapid Communications,* vol. 11, No. 12, pp. 697–701, 1991.

E. A. Benham, et al., A Process for the Simultaneous Oligomerization and Copolymerization of Ethylene, *Polymer Engineering and Science,* 28, 1469–1472, Nov. 1988.

Richard W. Barnhart, et al., Synthesis of Branched Polyolefins Using a Combination of Homogeneous Metallocene Mimics, *J. Am. Chem. Soc.,* 120, 1082–1083, 1998.

*Primary Examiner*—David W. Wu
*Assistant Examiner*—R. Harlan

[57] ABSTRACT

Mixtures of different polyolefins or branched polyolefins may be made by direct, preferably simultaneous, polymerization of one or more polymerizable olefins using two or more transition metal containing active polymerization catalyst systems, one of which contains preferably late transition metals complexed to selected ligands. The polyolefin products may have polymers that vary in molecular weight, molecular weight distribution, crystallinity, or other factors, and are useful as molding resins and for films.

33 Claims, No Drawings

POLYMERIZATION OF OLEFINS

This application claims the benefit of U.S. Provisional Application Ser. No. 60/057,077, filed Aug. 27, 1997.

FIELD OF THE INVENTION

Polymers with varied and useful properties may be produced in processes using at least two polymerization catalysts, at least one of which is preferably a late metal polymerization catalyst, for the synthesis of polyolefins.

TECHNICAL BACKGROUND

Polyolefins are most often prepared by polymerization processes in which a transition metal containing catalyst system is used. Depending on the process conditions used and the catalyst system chosen, polymers, even those made from the same monomer(s) may have varying properties. Some of the properties which may change are molecular weight and molecular weight distribution, crystallinity, melting point, and glass transition temperature. Except for molecular weight and molecular weight distribution, branching can affect all the other properties mentioned.

It is known that certain transition metal containing polymerization catalysts, especially containing late transition metals such as nickel, palladium, cobalt and iron, are especially useful in varying the branching in polyolefins made with them, see for instance World Patent Applications 96/23010 and 97/02298. It is also known that blends of distinct polymers, that vary for instance in the properties listed above, may have advantageous properties compared to "single" polymers. For instance it is known that polymers with broad or bimodal molecular weight distributions may be melt processed (be shaped) more easily than narrower molecular weight distribution polymers. Similarly, thermoplastics such as crystalline polymers may often be toughened by blending with elastomeric polymers.

Therefore, methods of producing polymers which inherently produce polymer blends are useful especially if a later separate (and expensive) polymer mixing step can be avoided. However in such polymerizations one should be aware that two different catalysts may interfere with one another, or interact in such a way as to give a single polymer.

SUMMARY OF THE INVENTION

This invention concerns a process for the polymerization of olefins, comprising, contacting under polymerizing conditions:

(a) a first active polymerization catalyst for said olefins which contains a Ti, Zr, Sc, V, Cr, a rare earth metal, Fe, Co, Ni or Pd complex of a ligand selected from the group consisting of:

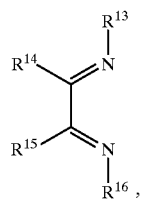
(IV)

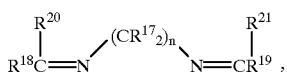
(V)

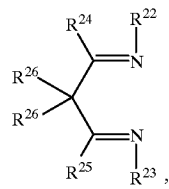
(VI)

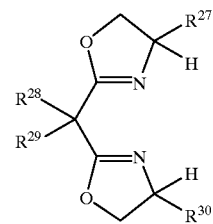
(VII)

$Ar^1Q_p$ (VIII); $R^{31}R^{32}N—CR^{33}R^{34}(CR^{35}R^{36})_m—NR^{31}R^{32}$ (IX);

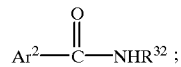
(X)

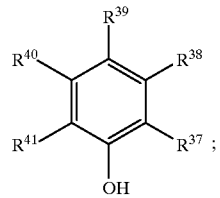
(XI)

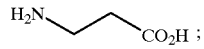
(XII)

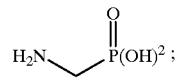
(XIII)

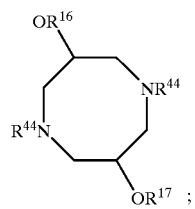
(XIV)

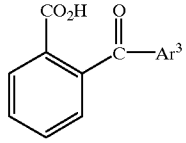
(XV)

-continued

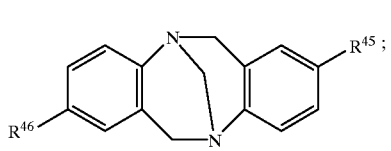
(XVI)

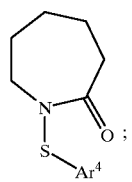
(XVII)

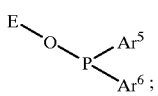
(XVIII)

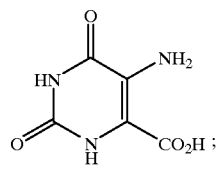
(XIX)

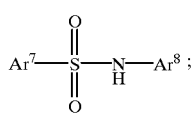
(XX)

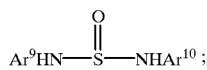
(XXI)

$R^{47}R^{48}R^{49}P$ (XXII);

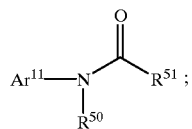
(XXIII)

and
$R^{31}S-CR^{33}R^{34}(CR^{35}R^{36})_m-SR^{31}$ (XXXVII);
wherein:
$Ar^1$ is an aromatic moiety with n free valencies, or diphenylmethyl;
each Q is $-NR^{52}R^{53}$ or $-CR^{54}=NR^{55}$;
p is 1 or 2;
E is 2-thienyl or 2-furyl;
each $R^{52}$ is independently hydrogen, benzyl, substituted benzyl, phenyl or substituted phenyl;
each $R^{54}$ is independently hydrogen or hydrocarbyl; and
each $R^{55}$ is independently a monovalent aromatic moiety;
m is 1, 2 or 3;
$R^{53}$ is hydrogen or alkyl;
each $R^{33}$ $R^{34}$ $R^{35}$ and $R^{36}$ is independently hydrogen, hydrocarbyl or substituted hydrocarbyl;
each $R^{31}$ is independently hydrocarbyl or substituted hydrocarbyl containing 2 or more carbon atoms;

each $R^{32}$ is independently hydrogen, hydrocarbyl or substituted hydrocarbyl;
$Ar^2$ is an aryl moiety;
$R^{38}$, $R^{39}$, and $R^{40}$ are each independently hydrogen, hydrocarbyl, substituted hydrocarbyl or an inert functional group;
$R^{37}$ and $R^{41}$ are each independently hydrocarbyl, substituted hydrocarbyl or an inert functional group whose $E_s$ is about −0.4 or less;
each $R^{42}$ and $R^{43}$ is independently hydrogen or acyl containing 1 to 20 carbon atoms;
$Ar^3$ is an aryl moiety;
$R^{45}$ and $R^{46}$ are each independently hydrogen or hydrocarbyl;
$Ar^4$ is an aryl moiety;
$Ar^5$ and $Ar^6$ are each independently hydrocarbyl;
$Ar^7$ and $Ar^8$ are each independently an aryl moiety;
$Ar^9$ and $Ar^{10}$ are each independently an aryl moiety or $-CO_2R^{56}$ wherein $R^{56}$ is alkyl containing 1 to 20 carbon atoms;
$Ar^{11}$ is an aryl moiety;
$R^{50}$ is hydrogen or hydrocarbyl;
$R^{51}$ is hydrocarbyl or $-C(O)-NR^{50}-Ar^{11}$;
$R^{44}$ is aryl;
$R^{47}$ and $R^{48}$ are each independently phenyl groups substituted by one or more alkoxy groups, each alkoxy group containing 1 to 20 carbon atoms;
$R^{49}$ is alkyl containing 1 to 20 carbon atoms, or an aryl moiety;
$R^{13}$ and $R^{16}$ are each independently hydrocarbyl or substituted hydrocarbyl, provided that the carbon atom bound to the imino nitrogen atom has at least two carbon atoms bound to it;
$R^{14}$ and $R^{15}$ are each independently hydrogen, hydrocarbyl, substituted hydrocarbyl, or $R^{14}$ and $R^{15}$ taken together are hydrocarbylene substituted hydrocarbylene to form a carbocyclic ring;
$R^{18}$ is hydrocarbyl or substituted hydrocarbyl, and $R^2$ is hydrogen, hydrocarbyl or substituted hydrocarbyl or $R^{18}$ and $R^{20}$ taken together form a ring;
$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;
each $R^{17}$ is independently hydrogen, substituted hydrocarbyl or hydrocarbyl, or two of $R^{17}$ taken together form a ring;
$R^{27}$ and $R^{30}$ are independently hydrocarbyl or substituted hydrocarbyl;
$R^{28}$ and $R^{29}$ are each in independently hydrogen, hydrocarbyl or substituted hydrocarbyl; and
n is 2 or 3;
(b) a second active polymerization catalyst for said olefins which contains one or more transition metals;
(c) a least one first olefin capable of being polymerized by said first active polymerization catalyst; and
(d) at least one second olefin capable of being polymerized by said second active polymerization catalyst.
This invention also concerns a process for the polymerization of olefins, comprising, contacting under polymerizing conditions:
(a) a first active polymerization catalyst for said olefins which contains a Ti, Zr, Sc, V, Cr, a rare earth metal, Fe, Co, Ni or Pd complex of a ligand selected from the groups consisting of:

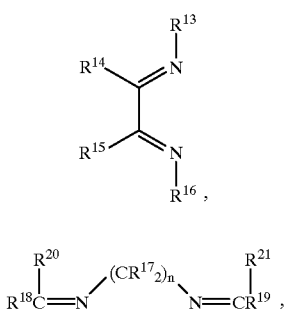 (IV)

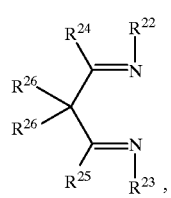 (V)

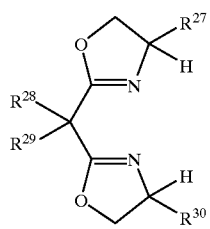 (VI)

 (VII)

$Ar^1Q_p$ (VIII); $R^{31}R^{32}N-CR^{33}R^{34}(CR^{35}R^{36})_m-NR^{31}R^{32}$ (IX);

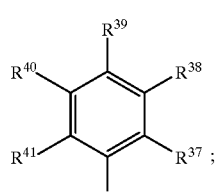 (X)

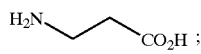 (XI)

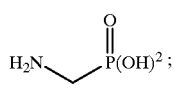 (XII)

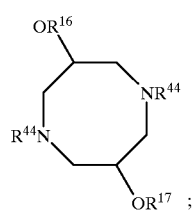 (XIII)

(XIV)

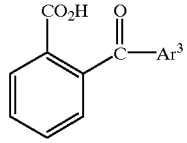 (XV)

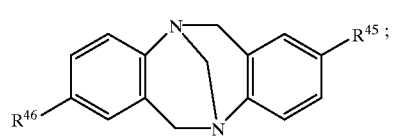 (XVI)

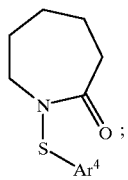 (XVII)

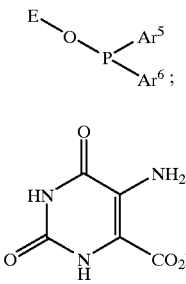 (XVIII)

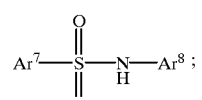 (XIX)

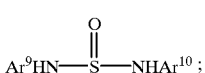 (XX)

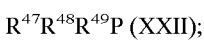 (XXI)

$R^{47}R^{48}R^{49}P$ (XXII);

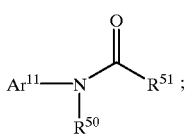 (XXIII)

and
$R^{31}S-CR^{33}R^{34}(CR^{35}R^{36})_m-SR^{31}$ (XXXVII);

wherein:
$Ar^1$ is an aromatic moiety with n free valencies, or diphenylmethyl;
each Q is $-NR^{52}R^{53}$ or $-CR^{54}=NR^{55}$;
p is 1 or 2;
E is 2-thienyl or 2-furyl;
each $R^{52}$ is independently hydrogen, benzyl, substituted benzyl, phenyl or substituted phenyl;
each $R^{54}$ is independently hydrogen or hydrocarbyl; and
each $R^{55}$ is independently a monovalent aromatic moiety;

m is 1, 2 or 3;

$R^{53}$ is hydrogen or alkyl;

each $R^{33}$, $R^{34}$, $R^{35}$, and $R^{36}$ is independently hydrogen, hydrocarbyl or substituted hydrocarbyl;

each $R^{31}$ is independently hydrocarbyl or substituted hydrocarbyl containing 2 or more carbon atoms;

each $R^{32}$ is independently hydrogen, hydrocarbyl or substituted hydrocarbyl;

$Ar^2$ is an aryl moiety;

$R^{38}$, $R^{39}$, and $R^{40}$ are each independently hydrogen, hydrocarbyl, substituted hydrocarbyl or an inert functional group;

$R^{37}$ and $R^{41}$ are each independently hydrocarbyl, substituted hydrocarbyl or an inert functional group whose $E_s$ is about −0.4 or less;

each $R^{42}$ and $R^{43}$ is independently hydrogen or acyl containing 1 to 20 carbon atoms;

$Ar^3$ is an aryl moiety;

$R^{45}$ and $R^{46}$ are each independently hydrogen or hydrocarbyl;

$Ar^4$ is an aryl moiety;

$Ar^5$ and $Ar^6$ are each independently hydrocarbyl;

$Ar^7$ and $Ar^8$ are each independently an aryl moiety;

$Ar^9$ and $Ar^{10}$ are each independently an aryl moiety or —$CO_2R^{56}$, wherein $R^{56}$ is alkyl containing 1 to 20 carbon atoms;

$Ar^{11}$ is an aryl moiety;

$R^{50}$ is hydrogen or hydrocarbyl;

$R^{51}$ is hydrocarbyl or —C(O)—$NR^{50}$—$Ar^{11}$;

$R^{44}$ is aryl;

$R^{47}$ and $R^{48}$ are each independently phenyl groups substituted by one or more alkoxy groups, each alkoxy group containing 1 to 20 carbon atoms;

$R^{49}$ is alkyl containing 1 to 20 carbon atoms, or an aryl moiety;

$R^{13}$ and $R^{16}$ are each independently hydrocarbyl or substituted hydrocarbyl, provided that the carbon atom bound to the imino nitrogen atom has at least two carbon atoms bound to it;

$R^{14}$ and $R^{15}$ are each independently hydrogen, hydrocarbyl, substituted hydrocarbyl, or $R^{14}$ and $R^{15}$ taken together are hydrocarbylene substituted hydrocarbylene to form a carbocyclic ring;

$R^{18}$ is hydrocarbyl or substituted hydrocarbyl, and $R^{20}$ is hydrogen, hydrocarbyl or substituted hydrocarbyl or $R^{18}$ and $R^{20}$ taken together form a ring;

$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;

each $R^{17}$ is independently hydrogen, substituted hydrocarbyl or hydrocarbyl, or two of $R^{17}$ taken together form a ring;

$R^{27}$ and $R^{30}$ are independently hydrocarbyl or substituted hydrocarbyl;

$R^{28}$ and $R^{29}$ are each in independently hydrogen, hydrocarbyl or substituted hydrocarbyl; and n is 2 or 3;

(b) a second active polymerization catalyst for said olefins which contains one or more transition metals;

(c) at least one first olefin capable of being polymerized by said first active polymerization catalyst; and (d) at least one second olefin capable of being polymerized by said second active polymerization catalyst; and provided that:

one or both of said first olefin and said second olefin is ethylene;

one of said first polymerization catalysts and said second polymerization catalyst produces an oligomer of the formula $R^{60}CH=CH_2$ from said ethylene, wherein $R^{60}$ is n-alkyl; and a branched polyolefin is a product of said polymerization process.

DETAILS OF THE INVENTION

In the polymerization processes and catalyst compositions described herein certain groups may be present. By hydrocarbyl is meant a univalent radical containing only carbon and hydrogen. By saturated hydrocarbyl is meant a univalent radical which contains only carbon and hydrogen, and contains no carbon—carbon double bonds, triple bonds and aromatic groups. By substituted hydrocarbyl herein is meant a hydrocarbyl group which contains one or more (types of) substitutents that does not interfere with the operation of the polymerization catalyst system. Suitable substituents in some polymerizations may include some or all of halo, ester, keto (oxo), amino, imino, carboxyl, phosphite, phosphonite, phosphine, phosphinite, thioether, amide, nitrile, and ether. Preferred substituents are halo, ester, amino, imino, carboxyl, phosphite, phosphonite, phosphine, phosphinite, thioether, and amide. Which substitutents are useful in which polymerizations may in some cases be determined by reference to World Patent Applications 96/23010 and 97/02298. By (substituted) hydrocarbylene is meant a group analogous to hydrocarbyl, except the radical is divalent. By benzyl is meant the $C_6H_5CH_2$— radical, and substituted benzyl is a radical in which one or more of the hydrogen atoms is replaced by a substituent group (which may include hydrocarbyl). By an aryl moiety is meant a univalent group whose free valence is to a carbon atom of an aromatic ring. The aryl moiety may contain one or more aromatic ring and may be substituted by inert groups. By phenyl is meant the $C_6H_5$— radical, and a phenyl moiety or substituted phenyl is a radical in which one or more of the to hydrogen atoms is replaced by a substituent group (which may include hydrocarbyl). Preferred substituents for substituted benzyl and phenyl include those listed above for substituted hydrocarbyl, plus hydrocarbyl. If not otherwise stated, hydrocarbyl, substituted hydrocarbyl and all other groups containing carbon atoms, such as alkyl, preferably contain 1 to 20 carbon atoms.

Where applicable, $E_s$ refers to the steric effect of a group. The steric effect of various groupings has been quantified by a parameter called $E_s$, see R. W. Taft, Jr., J. Am. Chem. Soc., vol. 74, p. 3120–3128 (1952), and M. S. Newman, Steric Effects in Organic Chemistry, John Wiley & Sons, New York, 1956, p. 598–603. For the purposes herein, the $E_s$ values are those described in these publications. If the value for $E_s$ for any particular group is not known, it can be determined by methods described in these publications. For the purposes herein, the value of hydrogen is defined to be the same as for methyl. It is preferred that the total $E_s$ value for the ortho (or other substituents closely adjacent to the —OH group) substitutents in the ring be about −1.5 or less, more preferably about −3.0 or less. Thus in a compound such as 2,4,6-tri-t-butylphenol only the $E_s$ values for the 2 and 6 substituted t-butyl groups would be applicable.

Noncoordinating ions are mentioned and useful herein. Such anions are well known to the artisan, see for instance W. Beck., et al., Chem. Rev., vol. 88, p. 1405–1421 (1988), and S. H. Strauss, Chem. Rev., vol. 93, p. 927–942 (1993), both of which are hereby included by reference. Relative coordinating abilities of such noncoordinating anions are described in these references, Beck at p. 1411, and Strauss at p. 932, Table III. Useful noncoordinating anions include $SbF_6^-$, BAF, $PF_6^-$, or $BF_4^-$, wherein BAF is tetrakis[3,5-bis(trifluoromethyl)phenyl]borate.

A neutral Lewis acid or a cationic Lewis or Bronsted acid whose counterion is a weakly coordinating anion is also present as part of the catalyst system. By a "neutral Lewis acid" is meant a compound which is a Lewis acid capable of abstracting $Q^-$ or $S^-$ from (I) to form a weakly coordination anion. The neutral Lewis acid is originally uncharged (i.e., not ionic).

Suitable neutral Lewis acids include $SbF_5$, $Ar_3B$ (wherein Ar is aryl), and $BF_3$. By a cationic Lewis acid is meant a cation with a positive charge such as $Ag^+$, $H^+$, and $Na^+$.

In those instances in which the transition metal compound does not contain an alkyl or hydride group already bonded to the metal (i.e., neither Q or S is alkyl or hydride), the neutral Lewis acid or a cationic Lewis or Bronsted acid also alkylates or adds a hydride to the metal, i.e., causes an alkyl group or hydride to become bonded to the metal atom, or a separate (from W) compound is added to add the alkyl or hydride group.

A preferred neutral Lewis acid, which can alkylate the metal, is a selected alkyl aluminum compound, such as $R^9{}_3Al$, $R^9{}_2AlCl$, $R^9AlCl_2$, and "$R^9AlO$" (alkylaluminoxanes), wherein $R^9$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $C_2H_5AlCl_2$, and $[(CH_3)_2CHCH_2]_3Al$. Metal hydrides such as $NaBH_4$ may be used to bond hydride groups to the metal M.

For (IV) through (XXIV) preferred formulas and compounds (as ligands for polymerization catalysts) are found in World Patent Applications 96/23010 and 97/02298, both of which are hereby included by reference, and preferred grouping and compounds in these applications are also preferred herein. However the compound numbers and group (i.e., $R^x$) numbers in these Applications may vary from those herein, but they are readily convertible. These applications also describe synthesis of the various ligands.

There are many different ways of preparing active polymerization catalysts of Ni or Pd coordination compounds of compounds (IV) through (XXIV), many of which are described in World Patent Applications 96/23010 and 97/02298, and those so described are applicable herein. "Pure" compounds which themselves may be active polymerization catalysts may be used, or the active polymerization catalyst may be prepared in situ by a variety of methods.

For instance, olefins may be polymerized by contacting, at a temperature of about $-100°$ C. to about $+200°$ C. a first compound W, which is a neutral Lewis acid capable of abstracting either $Q^-$ or $S^-$ to form $WQ^-$ or $WS^-$, provided that the anion formed is a weakly coordinating anion; or a cationic Lewis or Bronsted acid whose counterion is a weakly coordinating anion; a second compound of the formula

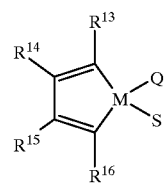

(XXV)

and one or more olefins wherein:
M is Ni or Pd;
$R^{13}$ and $R^{16}$ are each independently hydrocarbyl or substituted hydrocarbyl, provided that the carbon atom bound to the imino nitrogen atom has at least two carbon atoms bound to it;
$R^{14}$ and $R^{15}$ are each independently hydrogen, hydrocarbyl, substituted hydrocarbyl, or $R^{14}$ and $R^{15}$ taken together are hydrocarbylene or substituted hydrocarbylene to form a ring;
Q is alkyl, hydride, chloride, iodide, or bromide; and
S is alkyl, hydride, chloride, iodide, or bromide. In this instance it is preferred that W is an alkyl aluminum compound. Other methods for preparing active polymerization catalyst will be found in World Patent Applications 96/23010 and 97/02298 and in the Examples herein.

Which first active polymerization catalysts will polymerize which olefins will also be found in World Patent Applications 96/23010 and 97/02298. Monomers useful herein include ethylene, propylene, other α-olefins of the formula $R^{67}CH=CH_2$, wherein $R^{67}$ is n-alkyl containing 2 to about 20 carbon atoms, cyclopentene and norbornene. Preferred monomers are ethylene, propylene and cyclopentene, and ethylene is especially preferred.

In one preferred process described herein the first and second olefins are identical, and preferred olefins in such a process are the same as described immediately above. The first and/or second olefins may also be a single olefin or a mixture of olefins to make a copolymer. Again it is preferred that they be identical particularly in a process in which polymerization by the first and second polymerization catalysts make polymer simultaneously.

In some processes herein the first active polymerization catalyst may polymerize a monomer that may not be polymerized by said second active polymerization catalyst, and/or vice versa. In that instance two chemically distinct polymers may be produced. In another scenario two monomers would be present, with one polymerization catalyst producing a copolymer, and the other polymerization catalyst producing a homopolymer, or two copolymers may be produced which vary in the molar proportion or repeat units from the various monomers. Other analogous combinations will be evident to the artisan.

In another variation of the process described herein one of the polymerization catalysts makes an oligomer of an olefin, preferably ethylene, which oligomer has the formula $R^{60}CH=CH_2$, wherein $R^{60}$ is n-alkyl, preferably with an even number of carbon atoms. Preferably the α-olefin contains 4 to 32 ($R^{60}$ is 2 to 30), more preferably 8 to 20 ($R^{60}$ is 6 to 18), carbon atoms. The other polymerization catalyst in the process them (co)polymerizes this olefin, either by itself or preferably with at least one other olefin, preferably ethylene, to form a branched polyolefin. Preparation of the oligomer (which is sometimes called an α-olefin) by a first active polymerization-type of catalyst can be found in World Patent Application 96/23010.

Likewise, conditions for such polymerizations, particularly for catalysts of the first active polymerization type, will also be found in these patent applications. Briefly, the temperature at which the polymerization is carried out is about −100° C. to about +200° C., preferably about −20° C. to about +80° C. The polymerization pressure which is used with a gaseous olefin is not critical, atmospheric pressure to about 275 MPa, or more, being a suitable range. With a liquid monomer the monomer may be used neat or diluted with another liquid (solvent) for the monomer. The ratio of W:(I), when W is present, is preferably about 1 or more, more preferably about 10 or more when only W (no other Lewis acid catalyst) is present. These polymerizations may be batch, semi-batch or continuous processes, and may be carried out in liquid medium or the gas phase (assuming the monomers have the requisite volatility). These details will also be found in World Patent Applications 96/23010 and 97/02298.

In these polymerization processes a preferred ligand is (IV). In all cases herein where (IV) appears, including as a ligand, it is preferred that $R^{13}$ and $R^{16}$ are each independently hydrocarbyl provided that the carbon atom bound to the imino nitrogen atom has at least two carbon atoms bound to it; and $R^{14}$ and $R^{15}$ are each independently hydrogen, hydrocarbyl, or $R^{14}$ and $R^{15}$ taken together are hydrocarbylene to form a ring. Some useful combinations and/or individual groupings for $R^{13}$, $R^{14}$, $R^{15}$ and $R^{16}$ are shown in Table I.

TABLE I*

| $R^{13}$ | $R^{14}$ | $R^{15}$ | $R^{16}$ |
|---|---|---|---|
| 2,6-i-PrPh | Me | Me | 2,6-i-PrPh |
| 2,6-i-PrPh | H | H | 2,6-i-PrPh |
| 2,6-MePh | H | H | 2,6-MePh |
| 2,6-MePh | Me | Me | 2,6-MePh |
| 2,6-i-PrPh | Me | Me | 2,6-i-PrPh |
| 2,6-i-PrPh | Me | Me | 2,6-i-PrPh |
| 2,6-i-PrPh | Me | Me | 2,6-i-PrPh |
| 2,6-i-PrPh | H | H | 2,6-i-PrPh |
| 2,4,6-MePh | Me | Me | 2,4,6-MePh |
| 2,6-i-PrPh | An | An | 2,6-i-PrPh |
| 2,6-i-PrPh | Me | Me | 2,6-i-PrPh |
| Ph | Me | Me | Ph |
| 2,6-EtPh | Me | Me | 2,6-EtPh |
| 2,6-EtPh | Me | Me | 2,6-EtPh |
| 2-t-BuPh | Me | Me | 2-t-BuPh |
| 1-Np | Me | Me | 1-Np |
| Ph$_2$CH | H | H | Ph$_2$CH |
| 2-PhPh | Me | Me | 2-PhPh |
| Ph | a | a | Ph |
| Ph | Me | Me | Ph |
| Ph | Ph | Ph | Ph |
| Ph$_2$CH | H | H | Ph$_2$CH |
| Ph$_2$CH | H | H | Ph$_2$CH |
| 2,4,6-MePh | An | An | 2,4,6-MePh |
| 2,4,6-MePh | Ph | Ph | 2,4,6-MePh |

$^a$—CMe$_2$CH$_2$CMe$_2$—.
*In Table 1 and otherwise herein the following abbreviations are used:
Me = methyl;
Et = ethyl;
Cl = chloro;
Br = bromo;
i-Pr = isopropyl;
Ph = phenyl; and
An = 1,8-naphthylylene, TABLE I*-continued

| $R^{13}$ | $R^{14}$ | $R^{15}$ | $R^{16}$ |
|---|---|---|---|

To indicate substitution on a phenyl ring, the nomenclature is abbreviated, the number of ring positions indicating how many of the substituents are on the ring. For instance, 4-Br-2,6-MePh indicates 4-bromo-2,6-dimethylphenyl.

In all transition metal compounds it is preferred that the transition metal is Co, Fe, Ni or Pd, more preferably Ni or Pd, and especially preferably Ni.

Two chemically different active polymerization catalysts are used in the polymerization described herein. The first active polymerization catalyst is described in detail above. The second active polymerization catalyst may also meet the limitations of the first active polymerization catalyst, but must be chemically distinct. For instance, it may have a different transition metal present, and/or utilize a different type of ligand and/or the same type of ligand which differs in structure between the first and second active polymerization catalysts. For instance in Example 1, the metals are the same (Ni) and the ligand type is the same (IV), but the substituents on the ligands are different, resulting in a mixture of two polymers in the product. In one preferred process, the ligand type and the metal are the same, but the ligands differ in their substituents.

Included within the definition of two active polymerization catalysts are systems in which a single polymerization catalyst is added together with another ligand, preferably the same type of ligand, which can displace the original ligand coordinated to the metal of the original active polymerization catalyst, to produce in situ two different polymerization catalysts. Examples 2 and 3 herein illustrate this method of providing two different active polymerization catalysts.

However other types of catalysts may also be used for the second active polymerization catalyst. For instance so-called Ziegler-Natta and/or metallocene-type catalysts may also be used (see Examples 4 and 5). These types of catalysts are well known in the polyolefin field, see for instance Angew. Chem., Int. Ed. Engl., vol. 34, p. 1143–1170 (1995), European Patent Application 416,815 and U.S. Pat. No. 5,198,401 for information about metallocene-type catalysts, and J. Boor Jr., Ziegler-Natta Catalysts and Polymerizations, Academic Press, New York, 1979 for information about Ziegler-Natta-type catalysts, all of which are hereby included by reference. Many of the useful polymerization conditions for these types of catalyst and the first active polymerization catalysts coincide, so conditions for the polymerizations with first and second active polymerization catalysts are easily accessible. Oftentimes the "co-catalyst" or "activator" is needed for metallocene of Ziegler-Natta-type polymerizations, much as W is sometimes needed for polymerizations using the first active polymerization catalysts. In many instances the same compound, such as an alkylaluminum compound, may be used for these purposes for both types of polymerization catalysts.

The molar ratio of the first active polymerization catalyst to the second active polymerization catalyst used will depend on the ratio of polymer from each catalyst desired, and the relative rate of polymerization of each catalyst under the process conditions. For instance, if one wanted to prepare a "toughened" thermoplastic polyethylene that contained 80% crystalline polyethylene and 20% rubbery polyethylene, and the rates of polymerization of the two catalysts were equal, then one would use a 4:1 molar ratio of the catalyst that gave crystalline polyethylene to the catalyst that gave rubbery polyethylene. More than two active polymerization catalysts may also be used if the desired product is to contain more than two different types of polymer.

The polymers made by the first active polymerization catalyst and the second active polymerization catalyst may be made in sequence, i.e., a polymerization with one (either first or second) of the catalysts followed by a polymerization with the other catalyst, as by using two polymerization vessels in series. However it is preferred to carry out the polymerization using the first and second active polymerization catalysts in the same vessel(s), i.e., simultaneously. This is possible because in most instances the first and second active polymerization catalysts are compatible with each other, and they produce their distinctive polymers in the other catalyst's presence.

The polymers produced by this process may vary in molecular weight and/or molecular weight distribution and/or melting point and/or level of crystallinity, and/or glass transition temperature or other factors. For copolymers the polymers may differ in ratios of comonomers if the different polymerization catalysts polymerize the monomers present at different relative rates. The polymers produced are useful as molding and extrusion resins and in films as for packaging. They may have advantages such as improved melt processing, toughness and improved low temperature properties.

In the Examples, the following abbreviations are used:

$\Delta H_f$—heat of fusion (melting)

DSC—Differential Scanning Calorimetry

EOC—end of chain

GPC—Gel Permeation Chromatography

MeOH—methanol

MMAO—methylaluminoxane modified with 30% i-butyl groups

Mn—number average molecular weight

Mp—peak molecular weight (in GPC)

Mw—weight average molecular weight

Mz—"z" average molecular weight

PE—polyethylene

TCB—1,2,4-trichlorobenzene

Tg—glass transition temperature

Tm—melting point

In the Examples transition metal complexes of (IV) are indicated by the use of the abbreviation "DAB". Immediately before the DAB are the groups represented by $R^{13}$ and $R^{16}$, while immediately after DAB are the groups represented by $R^{14}$ and $R^{15}$. The other groups coordinated to the metal and/or free anions present in the compound are also indicated.

$^{13}$C NMR was used to obtain branching. For the methods used, see World Patent Application 96/23010. All branches are reported as branches per 1000 methylene carbon atoms.

EXAMPLE 1

A mixture of 5.7 mg (0.0096 mmol) of [(2,6-i-PrPh)$_2$DABH$_2$]NiBr$_2$ and 5.1 mg (0.0082 mmol) of [(2,6-i-PrPh)$_2$DABMe$_2$]NiBr$_2$ was placed into a Parr® 600-mL stirred autoclave under nitrogen and 200 mL of dry, deaerated toluene was added. The solvent was saturated with ethylene at 101 kPa pressure (absolute) and heated to 50° C. Then 1.0 mL of modified methylaluminoxane (Akzo MMAO-3A; nominal 1.97M in heptane; contains about 30% isobutyl groups) was injected into the autoclave with stirring. The autoclave was pressurized with ethylene to 690 kPa and was stirred for 30 min at 50° C. The ethylene was vented and the polymerization was stopped by injecting 3.0 mL methanol. The autoclave contained a toluene solution of polyethylene. The polymer solution was poured into methanol, and the precipitated polymer was filtered and oven-dried at 70° C. to yield 13.2 g of tough, semi-rubbery polyethylene. DSC (10° C./min): 1st heat: Tm=35° C. (~1 J/g), 113° C. (54 J/g); 2nd heat: Tm=113° C. (44 J/g). GPC (trichlorobenzene solvent; 135° C.; linear PE standard): Mn=60,700; Mw=421,000; Mz=1,251,000; Mw/Mn=6.9. The GPC trace revealed a bimodal polymer with peak molecular weights at 66,000 and 540,000.

COMPARATIVE EXAMPLE A

A 5.0 mg (0.0080-mmol) sample of [(2,6-i-PrPh)$_2$DABMe$_2$]NiBr$_2$ was placed in a Parr® 600-mL stirred autoclave under nitrogen, and 200 mL of dry, deaerated toluene was added under nitrogen. The solution was saturated with ethylene at 101 kPa and heated to 42° C. Then 1.0 mL of modified methylalumoxane (Akzo MMAO-3A; nominal 1.9M in heptane; contains about 30% isobutyl groups) was injected into the autoclave with stirring. The autoclave was pressurized to 690 kPa with ethylene and stirred for 30 min at 50° C. The ethylene was vented; the autoclave contained a hazy solution of polyethylene. The polymer was precipitated from methanol and dried in vacuum oven (70° C.) to yield 11.4 g of rubbery polyethylene. DSC (10° C/min): Tg=–50° C.; Tm=37° C. (4 J/g). GPC (TCB; 135° C.; PE standard): Mn=267,000; Mw=607,000; Mz=1,209,000; Mp (peak mw)=520,000; Mw/Mn=2.28.

COMPARATIVE EXAMPLE B

A 4.9 mg (0.0082 mmol) sample of [(2,6-i-PrPh)$_2$DABH$_2$]NiBr$_2$ was placed in a Parr® 600-mL stirred autoclave under nitrogen, and 200 mL of dry, deaerated toluene was added under nitrogen. The solution was saturated with ethylene at 101 kPa and heated to 41° C. (water bath). Then 1.0 mL of modified methylalumoxane (Akzo MMAO-3A; nominal 1.9M in heptane; contains about 30% isobutyl groups) was injected into the autoclave with stirring. The autoclave was pressurized to 690 kPa with ethylene and stirred for 30 min at 50° C. The ethylene was vented; the autoclave contained a suspension of particulate polyethylene. The polymer suspension was precipitated from methanol and dried in vacuum oven (70° C.) to yield 17.7 g of crystalline polyethylene. DSC (10° C/min): Tm=111° C. (109 J/g). GPC (TCB; 135° C.; PE standard): Mn=29,000; Mw=65,000; Mz=147,000; Mp (peak mw)=53,000; Mw/Mn=2.24.

EXAMPLE 2

A mixture of 5.1 mg (0.0086 mmol) [(2,6-i-PrPh)$_2$DABH$_2$]NiBr$_2$ and 5.0 mg (0.012 mmole) of ligand (2,6-i-PrPh)$_2$DABMe$_2$ was placed in a Parr® 600-mL stirred autoclave under nitrogen, and 200 mL of dry, deaerated toluene was added under nitrogen. The solution was saturated with ethylene at 101 kPa and heated to 50° C. Then 1.0 mL of modified methylalumoxane (Akzo MMAO-3A; nominal 1.9M in heptane; contains about 30% isobutyl groups) was injected into the autoclave with stirring. The autoclave was pressured to 690 kPa with ethylene and stirred for 30 min at 50° C. The ethylene was vented; the autoclave contained a suspension of polyethylene. The polymer was precipitated from methanol and dried in vacuum oven (70° C.) to yield 21.2 g of crystalline polyethylene. DSC (10° C/min): Tm=119° C. (129 J/g), shoulder at 112° C. GPC (TCB; 135° C.; PE standard): Mn=27,000; Mw=180,000; Mz=1,317,000; Mp (peak mw)=55,400; Mw/Mn=6.69. The GPC trace was bimodal with a high-mw shoulder centered at approximately 500,000 Daltons.

EXAMPLE 3

A mixture of 5.0 mg (0.0080 mmol) [(2,6-i-PrPh)$_2$DABMe$_2$]NiBr$_2$ and 5.2 mg (0.014 mmole) of ligand (2,6-i-PrPh)$_2$DABH$_2$ was placed into a Parr® 600-mL stirred autoclave under nitrogen, and 200 mL of dry, deaerated toluene was added under nitrogen. The solution was saturated with ethylene at 101 kPa and heated to 50° C. Then 1.0 mL of modified methylalumoxane (Akzo MMAO-3A; nominal 1.9M in heptane; contains about 30% isobutyl groups) was injected into the autoclave with stirring. The autoclave was pressurized to 690 kPa with ethylene and stirred for 30 min at 50° C. The ethylene was vented; the autoclave contained a hazy solution of polyethylene. The polymer was precipitated from methanol and dried in vacuum oven (70° C.) to yield 12.3 g of rubbery polyethylene. DSC (10° C./min): Tg=−45° C.; Tm=38° C. (6 J/g), 117° C. (31 J/g). GPC (TCB; 135° C.; PE standard): Mn=123,000; Mw=553,000; Mz=1,275,000; Mp (peak mw)=570,000; Mw/Mn=4.48. The GPC trace was clearly bimodal with a low-mw shoulder centered at 80,000 Daltons.

EXAMPLE 4

Two mg of [(2,6-i-PrPh)$_2$DABH$_2$]NiBr$_2$ (3.5 μmol) and 1 mg of (C$_5$H$_5$)$_2$ZrCl$_2$ (3.4 μmol) were dissolved in 30 mL of dry toluene. The resulting solution was loaded into a 100 ml autoclave. A solution of 1 ml MMAO-3A (Akzo-Nobel 1.97M in Al) in 5 ml of toluene was injected into the reactor with 690 kPa of ethylene at room temperature. The ethylene pressure was kept constant throughout the 1 h reaction and the temperature rose to about 40° C. The reactor was vented, and the polymerization was quenched by the addition of 3 ml of 10% HCl/MeOH. The solid polymer was washed with MeOH and dried. Yield 2.05 g of white polyethylene. GPC (TCB at 135° C.) Mn 97,900, Mw 358,000. DSC (10° C/min) second melt Tm 136° C., ΔH$_f$ 216.3 J/g.

EXAMPLE 5

Four mg of [(2,6-i-PrPh)$_2$DABH$_2$]NiBr$_2$ (6.7 μmol) and 2 mg of (C$_5$H$_5$)$_2$ZrCl$_2$ (6.8 μmol) were dissolved in 30 mL of dry toluene. The resulting solution was loaded into a 100 ml autoclave. A solution of 1 ml MMAO-3A (Akzo-Nobel 1.97M in Al) in 5 ml of toluene was injected into the reactor with 690 kPa of ethylene at room temperature. The ethylene pressure was kept constant throughout the 1 h reaction and the temperature rose to about 35° C. The reactor was vented, and the polymerization was quenched by the addition of 20 ml of 10% HCl/MeOH. The reactor was vented, and the polymerization was quenched by the addition of 20 ml of 10% HCl/MeOH. The solid polymer was washed with MeOH and dried. Yield 9.28 g of white polyethylene. GPC (TCB at 135° C.) Mn=36,000, Mw=359,300. DSC (15° C./min) second melt Tm 133° C., ΔH$_f$ 137 J/g. $^{13}$C NMR: Total branches (total methyl groups) 10.8; methyl, 8.4; ethyl, 0.4; propyl, 0.3; butyl, 0.3; amyl, 0.4; hexyl+and EOC, 2.0.

What is claimed is:

1. A process for the polymerization of olefins, comprising, contacting under polymerizing conditions:

(a) a first active polymerization catalyst for said olefins which contains a transition metal complex of a ligand selected from the groups consisting of:

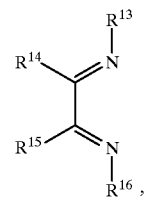
(IV)

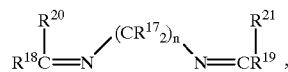
(V)

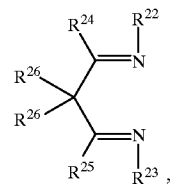
(VI)

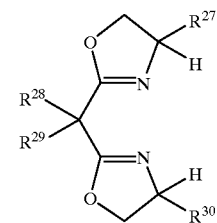
(VII)

Ar$^1$Q$_p$ (VIII); R$^{31}$R$^{32}$N—CR$^{33}$R$^{34}$(CR$^{35}$R$^{36}$)$_m$—NR$^{31}$R$^{32}$ (IX)

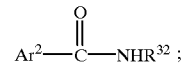
(X)

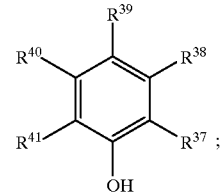
(XI)

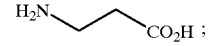
(XII)

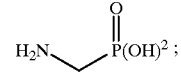
(XIII)

-continued

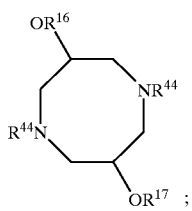 (XIV)

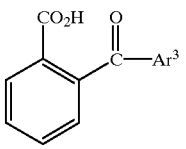 (XV)

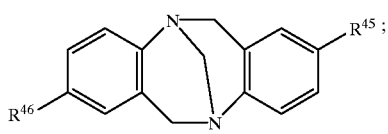 (XVI)

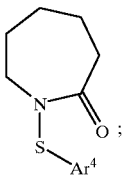 (XVII)

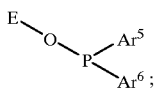 (XVIII)

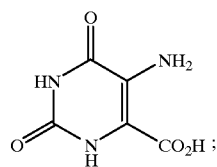 (XIX)

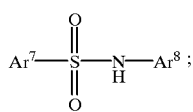 (XX)

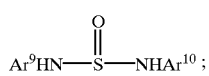 (XXI)

$R^{47}R^{48}R^{49}P$ (XXII);

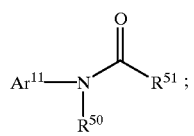 (XXIII)

and $R^{31}S-CR^{33}R^{34}(CR^{35}R^{36})_m-SR^{31}$ (XXXVII)

wherein:

for (IV), (V), (VI) and (VII), the transition metal is selected from the group consisting of Fe, Co, Ni and Pd;

for (VIII), (IX), (X), (XI), (XII), (XIII), (XIV), (XV), (XVI), (XVII), (XVIII), (XIX), (XX), (XXI), (XXII), (XXIII) and (XXXVII), the transition metal is selected from the group consisting of Ti, Zr, Sc, V, Cr, a rare earth metal, Fe, Co, Ni and Pd;

$Ar^1$ is an aromatic moiety with n free valencies, or diphenylmethyl;

each Q is $-NR^{52}R^{53}$ or $-CR^{54}=NR^{55}$;

p is 1 or 2;

E is 2-thienyl or 2-furyl;

each $R^{52}$ is independently hydrogen, benzyl, substituted benzyl, phenyl or substituted phenyl;

each $R^{54}$ is independently hydrogen or hydrocarbyl; and each $R^{55}$ is independently a monovalent aromatic moiety;

m is 1, 2 or 3;

$R^{53}$ is hydrogen or alkyl;

each $R^{33}$, $R^{34}$, $R^{35}$, and $R^{36}$ is independently hydrogen, hydrocarbyl or substituted hydrocarbyl;

each $R^{31}$ is independently hydrocarbyl or substituted hydrocarbyl containing 2 or more carbon atoms;

each $R^{32}$ is independently hydrogen, hydrocarbyl or substituted hydrocarbyl;

$Ar^2$ is an aryl moiety;

$R^{38}$, $R^{39}$, and $R^{40}$ are each independently hydrogen, hydrocarbyl, substituted hydrocarbyl or an inert functional group;

$R^{37}$ and $R^{41}$ are each independently hydrocarbyl, substituted hydrocarbyl or an inert functional group whose $E_s$ is about $-0.4$ or less;

each $R^{42}$ and $R^{43}$ is independently hydrogen or acyl containing 1 to 20 carbon atoms;

$Ar^3$ is an aryl moiety;

$R^{45}$ and $R^{46}$ are each independently hydrogen or hydrocarbyl;

$Ar^4$ is an aryl moiety;

$Ar^5$ and $Ar^6$ are each independently hydrocarbyl;

$Ar^7$ and $Ar^8$ are each independently an aryl moiety;

$Ar^9$ and $Ar^{10}$ are each independently an aryl moiety or $-CO_2R^{56}$, wherein $R^{56}$ is alkyl containing 1 to 20 carbon atoms;

$Ar^{11}$ is an aryl moiety;

$R^{50}$ is hydrogen or hydrocarbyl;

$R^{51}$ is hydrocarbyl or $-C(O)-NR^{50}-Ar^{11}$;

$R^{44}$ is aryl;

$R^{47}$ and $R^{48}$ are each independently phenyl groups substituted by one or more alkoxy groups, each alkoxy group containing 1 to 20 carbon atoms;

$R^{49}$ is alkyl containing 1 to 20 carbon atoms, or an aryl moiety;

$R^{13}$ and $R^{16}$ are each independently hydrocarbyl or substituted hydrocarbyl, provided that the carbon atom bound to the imino nitrogen atom has at least two carbon atoms bound to it;

$R^{14}$ and $R^{15}$ are each independently hydrogen, hydrocarbyl, substituted hydrocarbyl, or $R^{14}$ and $R^{15}$ taken together are hydrocarbylene substituted hydrocarbylene to form a carbocyclic ring;

$R^{18}$ is hydrocarbyl or substituted hydrocarbyl, and $R^{20}$ is hydrogen, hydrocarbyl or substituted hydrocarbyl or $R^{18}$ and $R^{20}$ taken together form a ring;

$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;

each $R^{17}$ is independently hydrogen, substituted hydrocarbyl or hydrocarbyl, or two of $R^{17}$ taken together form a ring;

$R^{27}$ and $R^{30}$ are independently hydrocarbyl or substituted hydrocarbyl;

$R^{28}$ and $R^{29}$ are each in independently hydrogen, hydrocarbyl or substituted hydrocarbyl; and n is 2 or 3;

(b) a second active polymerization catalyst for said olefins which contains one or more transition metals;

(c) at least one first olefin capable of being polymerized by said first active polymerization catalyst; and (d) at least one second olefin capable of being polymerized by said second active polymerization catalyst.

2. The process as recited in claim 1 wherein said first active polymerization catalyst is a Ni or Pd complex.

3. The process as recited in claim 1 wherein said first active polymerization catalyst is a Ni complex.

4. The process as recited in claim 1 wherein said ligand in said first active polymerization catalyst is (IV).

5. The process as recited in claim 3 wherein said ligand in said first active polymerization catalyst is (IV).

6. The process as recited in claim 1 wherein said second active polymerization catalyst has a formula as defined for said first active polymerization catalyst, but is different from said first active polymerization catalyst.

7. The process as recited in claim 6 wherein said first active polymerization catalyst and said second active polymerization catalyst is an Ni or Pd complex, and said ligand is (IV).

8. The process as recited in claim 7 wherein said first active polymerization catalyst and said second active polymerization catalyst is an Ni complex, and said ligand is (IV).

9. The process as recited in claim 1 wherein said second active polymerization catalyst is a Ziegler-Natta or a metallocene polymerization catalyst.

10. The process as recited in claim 5 wherein said second active polymerization catalyst is a Ziegler-Natta or a metallocene polymerization catalyst.

11. The process as recited in claim 1, 3, 5, 6, 8, 9 or 10 wherein said first olefin and said second olefin are each independently one or more of ethylene, propylene, an olefins of the formula $R^{67}CH=CH_2$ wherein $R^{67}$ is n-alkyl containing 2 to about 20 carbon atoms, cyclopentene, or norbornene.

12. The process as recited in claim 1, 3, 5, 6, 8, 9 or 10 wherein said first olefin and said second olefin is each independently one or both of ethylene or propylene.

13. The process as recited in claim 1, 3, 5, 6, 8, 9 or 10 wherein said first olefin and said second olefin are ethylene.

14. The process as recited in claim 1 wherein said polymerization with said first active polymerization catalyst and said polymerization with said second polymerization catalyst are carried out simultaneously.

15. The process as recited in claim 1 wherein said first olefin and said second olefin are the same.

16. A process for the polymerization of olefins, comprising, contacting under polymerizing conditions:

(a) a first active polymerization catalyst for said olefins which contains a Ti, Zr, Sc, V, Cr, a rare earth metal, Fe, Co, Ni or Pd complex of a ligand selected from the groups consisting of:

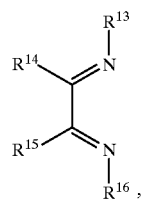
(IV)

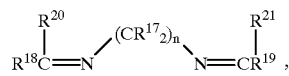
(V)

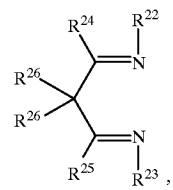
(VI)

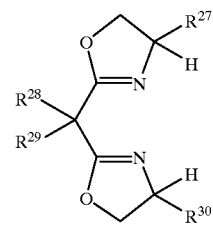
(VII)

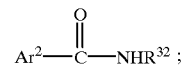
$Ar^1Q_p$ (VIII); $R^{31}R^{32}N-CR^{33}R^{34}(CR^{35}R^{36})_m-R^{31}R^{32}$ (IX);

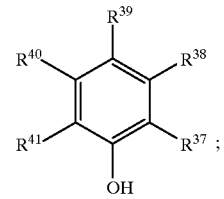
(X)

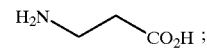
(XI)

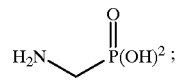
(XII)

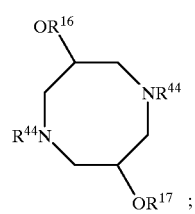
(XIII)

(XIV)

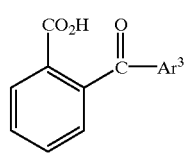
(XV)

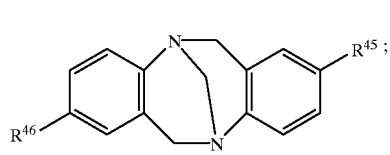
(XVI)

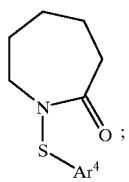
(XVII)

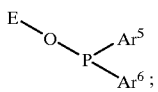
(XVIII)

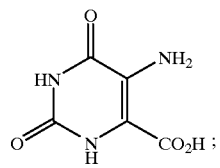
(XIX)

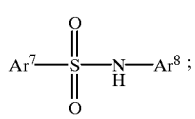
(XX)

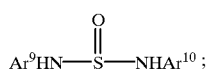
(XXI)

$R^{47}R^{48}R^{49}P$ (XXII);

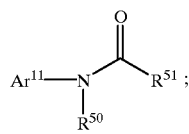
(XXIII)

and
$R^{31}S-CR^{33}R^{34}(CR^{35}R^{36})_m-SR^{31}$ (XXXVII);
wherein:
Ar$^1$ is an aromatic moiety with n free valencies, or diphenylmethyl;
each Q is $-NR^{52}R^{53}$ or $-CR^{54}=NR^{55}$
p is 1 or 2;
E is 2-thienyl or 2-furyl;
each $R^{52}$ is independently hydrogen, benzyl, substituted benzyl, phenyl or substituted phenyl;
each $R^{54}$ is independently hydrogen or hydrocarbyl; and
each $R^{55}$ is independently a monovalent aromatic moiety;

m is 1, 2 or 3;
$R^{53}$ is hydrogen or alkyl;
each $R^{33}$, $R^{34}$, $R^{35}$, and $R^{36}$ is independently hydrogen, hydrocarbyl or substituted hydrocarbyl;
each $R^{31}$ is independently hydrocarbyl or substituted hydrocarbyl containing 2 or more carbon atoms;
each $R^{32}$ is independently hydrogen, hydrocarbyl or substituted hydrocarbyl;
Ar$^2$ is an aryl moiety;
$R^{38}$, $R^{39}$, and $R^{40}$ are each independently hydrogen, hydrocarbyl, substituted hydrocarbyl or an inert functional group;
$R^{37}$ and $R^{41}$ are each independently hydrocarbyl, substituted hydrocarbyl or an inert functional group whose $E_s$ is about −0.4 or less;
each $R^{42}$ and $R^{43}$ is independently hydrogen or acyl containing 1 to 20 carbon atoms;
Ar$^3$ is an aryl moiety;
$R^{45}$ and $R^{46}$ are each independently hydrogen or hydrocarbyl;
Ar$^4$ is an aryl moiety;
Ar$^5$ and Ar$^6$ are each independently hydrocarbyl;
Ar$^7$ and Ar$^8$ are each independently an aryl moiety;
Ar$^9$ and Ar$^{10}$ are each independently an aryl moiety or $-CO_2R^{56}$, wherein $R^{56}$ is alkyl containing 1 to 20 carbon atoms;
Ar$^{11}$ is an aryl moiety;
$R^{50}$ is hydrogen or hydrocarbyl;
$R^{51}$ is hydrocarbyl or $-C(O)-NR^{50}-Ar^{11}$;
$R^{44}$ is aryl;
$R^{47}$ and $R^{48}$ are each independently phenyl groups substituted by one or more alkoxy groups, each alkoxy group containing 1 to 20 carbon atoms;
$R^{49}$ is alkyl containing 1 to 20 carbon atoms, or an aryl moiety;
$R^{13}$ and $R^{16}$ are each independently hydrocarbyl or substituted hydrocarbyl, provided that the carbon atom bound to the imino nitrogen atom has at least two carbon atoms bound to it;
$R^{14}$ and $R^{15}$ are each independently hydrogen, hydrocarbyl, substituted hydrocarbyl, or $R^{14}$ and $R^{15}$ taken together are hydrocarbylene substituted hydrocarbylene to form a carbocyclic ring;
$R^{18}$ is hydrocarbyl or substituted hydrocarbyl, and $R^{20}$ is hydrogen, hydrocarbyl or substituted hydrocarbyl or $R^{18}$ and $R^{20}$ taken together form a ring;
$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;
each $R^{17}$ is independently hydrogen, substituted hydrocarbyl or hydrocarbyl, or two of $R^{17}$ taken together form a ring;
$R^{27}$ and $R^{30}$ are independently hydrocarbyl or substituted hydrocarbyl;
$R^{28}$ and $R^{29}$ are each in independently hydrogen, hydrocarbyl or substituted hydrocarbyl; and
n is 2 or 3;
(b) a second active polymerization catalyst for said olefins which contains one or more transition metals;
(c) at least one first olefin capable of being polymerized by said first active polymerization catalyst; and
(d) at least one second olefin capable of being polymerized by said second active polymerization catalyst; and
provided that:
one or both of said first olefin and said second olefin is ethylene;

one of said first polymerization catalysts and said second polymerization catalyst produces an oligomer of the formula $R^{60}CH=CH_2$ from said ethylene, wherein $R^{60}$ is an n-alkyl of 2 to 30 carbon atoms;

a branched polyolefin is a product of said polymerization process.

17. The process as recited in claim 16 wherein said first active polymerization catalyst is a Ni or Pd complex.

18. The process as recited in claim 16 wherein said first active polymerization catalyst is a Ni complex.

19. The process as recited in claim 16 wherein said ligand in said first active polymerization catalyst is (IV).

20. The process as recited in claim 18 wherein said ligand in said first active polymerization catalyst is (IV).

21. The process as recited in claim 16 or 20 wherein said second olefin is ethylene.

22. The process as recited in claim 16 wherein said second active polymerization catalyst is a Ziegler-Natta or a metallocene polymerization catalyst.

23. A process for the polymerization of olefins, comprising, contacting under polymerizing conditions:
- (a) at least two active polymerization catalysts, at least one of which is a late transition metal catalyst wherein the late transition metal is selected from the group consisting of Fe and Co;
- (b) at least one first olefin capable of being polymerized by one of said at least two active polymerization catalysts; and
- (c) at least one second olefin capable of being polymerized by another of said at least two active polymerization catalysts; and provided that:

one or both of said first olefin and said second olefin is ethylene;

one of said at least two polymerization catalysts produces an oligomer of the formula $R^{60}CH=CH_2$ from said ethylene, wherein $R^{60}$ is n-alkyl and contains 2 to 30 carbon atoms; and a branched polyolefin is a product of said polymerization process.

24. The process as recited in claim 23 wherein the one of said at least two polymerization catalysts that produces said oligomer is a late transition metal catalyst.

25. The process as recited in claim 23 wherein the late transition metal of said late transition metal catalyst is Fe.

26. The process as recited in claim 23 wherein another of said at least two active polymerization catalysts is a Ziegler-Natta or a metallocene polymerization catalyst.

27. The process as recited in claim 23 wherein ethylene is the only olefin.

28. The process as recited in claim 23 wherein the one of said at least two polymerization catalysts that produces said oligomer is a late transition metal catalyst, another of said at least two active polymerization catalysts is a Ziegler-Natta or a metallocene polymerization catalyst, and ethylene is the only olefin.

29. The process as recited in claim 23 wherein the one of said at least two polymerization catalysts that produces said oligomer is a late transition metal catalyst, the late transition metal of said late transition metal catalyst is Fe, another of said at least two active polymerization catalysts is a Ziegler-Natta or a metallocene polymerization catalyst, and ethylene is the only olefin.

30. A process for the polymerization of olefins, comprising, contacting under polymerizing conditions:
- (a) at least two active polymerization catalysts, at least one of which is a late transition metal catalyst wherein the late transition metal is selected from the group consisting of Fe and Co;
- (b) at least one first olefin capable of being polymerized by one of said at least two active polymerization catalysts; and
- (c) at least one second olefin capable of being polymerized by another of said at least two active polymerization catalysts;

provided that one or both of said first olefin and said second olefin is ethylene.

31. The process as recited in claim 30 wherein the late transition metal of said late transition metal catalyst is Fe.

32. The process as recited in claim 30 wherein another of said at least two active polymerization catalysts is a Ziegler-Natta or a metallocene polymerization catalyst.

33. The process as recited in claim 31 wherein another of said at least two active polymerization catalysts is a Ziegler-Natta or a metallocene polymerization catalyst.

* * * * *